United States Patent
Larmo et al.

(10) Patent No.: US 9,871,625 B2
(45) Date of Patent: Jan. 16, 2018

(54) STATUS REPORTING FOR RETRANSMISSION PROTOCOL

(75) Inventors: Anna Larmo, Espoo (FI); Michael Meyer, Aachen (DE); Johan Torsner, Masaby (FI)

(73) Assignee: ID TP Holdings, Inc., Wilmington, DE (US)

( * ) Notice: Subject to any disclaimer, the term of this patent is extended or adjusted under 35 U.S.C. 154(b) by 436 days.

(21) Appl. No.: 12/811,732

(22) PCT Filed: Dec. 1, 2008

(86) PCT No.: PCT/SE2008/051380
§ 371 (c)(1),
(2), (4) Date: Jul. 6, 2010

(87) PCT Pub. No.: WO2009/088343
PCT Pub. Date: Jul. 16, 2009

(65) Prior Publication Data
US 2010/0278051 A1  Nov. 4, 2010

Related U.S. Application Data

(60) Provisional application No. 61/019,417, filed on Jan. 7, 2008.

(51) Int. Cl.
*H04L 1/16* (2006.01)
*H04L 1/18* (2006.01)

(52) U.S. Cl.
CPC .......... *H04L 1/1607* (2013.01); *H04L 1/1848* (2013.01)

(58) Field of Classification Search
None
See application file for complete search history.

(56) References Cited

U.S. PATENT DOCUMENTS

2004/0208160 A1* 10/2004 Petrovic et al. ............... 370/350
2006/0067238 A1*  3/2006 Olsson .................. H04L 1/0083
                                                                    370/242

(Continued)

FOREIGN PATENT DOCUMENTS

EP    1465369 A1    10/2004
EP    1641190 A1     3/2006
(Continued)

OTHER PUBLICATIONS

3rd Generation Partnership Project (3GPP), TS 36.322, V2.0.0, "3rd Generation Partnership Project: Technical Specification Group Radio Access Network; Evolved Universal Terrestrial Radio Access (E-UTRA) Radio Link Control (RLC) protocol specification (Release 8)," Nov. 2007, 34 pages.

(Continued)

*Primary Examiner* — Christopher Crutchfield
*Assistant Examiner* — Thinh Tran
(74) *Attorney, Agent, or Firm* — Condo Roccia Koptiw LLP

(57) ABSTRACT

A method of transmitting a status report from a receiving terminal to a transmitting terminal is disclosed. A receiving terminal generates a status report according to a first retransmission protocol implemented by a higher layer protocol layer and sends the status report to a transmitting terminal in one or more data units of a lower layer protocol. If the lower layer data units are not successfully received, the lower layer protocol provides a failure indication, referred to as a local NACK, to the higher layer protocol. In response to the failure indication, the higher layer protocol generates an updated status report and sends the updated status report from the receiving terminal to the transmitting terminal.

20 Claims, 4 Drawing Sheets

(56) References Cited

U.S. PATENT DOCUMENTS

| | | | | |
|---|---|---|---|---|
| 2007/0177630 A1* | 8/2007 | Ranta | ............... | H04L 1/1685 370/473 |
| 2008/0043619 A1* | 2/2008 | Sammour | ............ | H04L 1/1685 370/231 |
| 2009/0104890 A1 | 4/2009 | Wang et al. | | |
| 2009/0264127 A1* | 10/2009 | Chun | ............... | H04L 1/1607 455/435.2 |

FOREIGN PATENT DOCUMENTS

| | | |
|---|---|---|
| JP | 2009520389 A | 5/2009 |
| WO | 2007/063393 A2 | 6/2007 |

OTHER PUBLICATIONS $3^{rd}$ Generation Partnership Project (3GPP), TS 36.322, V1.0.0, "$3^{rd}$ Generation Partnership Project: Technical Specification Group Radio Access Network; Evolved Universal Terrestrial Radio Access (E-UTRA) Radio Link Control (RLC) protocol specification (Release 8)," Sep. 2007, 19 pages.

3rd Generation Partnership Project (3GPP), R2-073895, "Polling and status reporting", Nokia Corporation, Nokia Siemens Networks, 3GPP TSG-RAN WG2, Meeting #59bis, Shanghai, China, Oct. 8-12, 2007, 10 pages.

$3^{rd}$ Generation Partnership Project (3GPP), R2-074949, "MAC Rapporteurs", Ericsson, Qualcomm Europe, 3GPP TSG-RAN WG2, #60, Jeju Island, Korea, Nov. 5-9, 2007.

$3^{rd}$ Generation Partnership Project (3GPP), TS 36.321, V1.1.1, "$3^{rd}$ Generation Partnership Project: Technical Specification Group Radio Access Network; Evolved Universal Terrestrial Radio Access (E-UTRA) Medium Access Control (MAC) protocol specification (Release 8)", Oct. 2007, 25 pages.

"ARQ-Protokoll", (in German), Dec. 3, 2007 version, 3 pages.

"ARQ-Protokoll", (English translation), Wikipedia, Dec. 3, 2007 version, 3 pages.

3rd Generation Partnership Project (3GPP), Tdoc NP-99260 (Revision of Tdoc N1-99963), "XID Collision Corrections", Ericsson, Matsushita, Motorola, Nokia, Siemens, 3GPP TSG CN, Kyongju, Korea, Oct. 6-8, 1999, 16 pages.

3rd Generation Partnership Project (3GPP), TR 21.900 V7.2.0, "Technical Specification Group Services and System Aspects, Technical Specification Group Working Methods (Release 7)", Jun. 2006, 34 pages.

3rd Generation Partnership Project (3GPP), TS 36.321 V1.1.0, "Technical Specification Group Radio Access Network, Evolved Universal Terrestrial Radio Access (E-UTRA), Medium Access Control (MAC) Protocol Specification (Release 8)", Oct. 2007, 21 pages.

* cited by examiner

STATUS REPORTING FOR RETRANSMISSION PROTOCOL

TECHNICAL FIELD

The present invention relates generally to retransmission protocols for Radio Link Control (RLC) in wireless communication systems and, more particularly, to status reporting for the RLC retransmission protocol.

BACKGROUND

The Third-Generation Partnership Project (3GPP) has launched a project, known as "Long Term Evolution" or LTE, to develop specifications for an advanced wireless communication system. The LTE standard calls for a retransmission mechanism to be implemented in the radio link control (RLC) protocol. The specified retransmission protocol is a selective repeat protocol used in "RLC Acknowledged Mode". When a missing protocol data unit (PDU) is detected, a status report including a NACK of the missing PDU or PDUs is sent from the receiving terminal to the transmitting terminal. In response to the status report, the transmitting terminal may resend any lost PDUs, or take other action as appropriate. In LTE, a status report may also be transmitted in response to a poll request. A transmitting terminal may poll the receiving terminal for RLC status information. In response to a poll, the receiving terminal sends a status report indicating the current RLC status. Currently, there is no mechanism for retransmission of a status PDU.

SUMMARY

The present invention relates generally to retransmission protocols for the Radio Link Control (RLC) layer in mobile communication networks. The present invention is useful in communication systems based on the Long Term Evolution (LTE) standard, but may also be implemented in communication systems based on other standards. In LTE systems, RLC status PDUs are transmitted from a receiving terminal to a transmitting terminal when a missing data PDU is detected to indicate the RLC status. Status reports may also be sent responsive to a poll signal from the transmitting terminal. The RLC status PDUs are handed down to the MAC layer and transmitted in one or more Medium Access Control (MAC) PDUs. The MAC protocol includes a hybrid ARQ (HARQ) mechanism. If a MAC PDU carrying an RLC status PDU is not successfully received by the transmitting terminal, the MAC protocol provides a failure indication referred to herein as a local NACK to the RLC protocol. The local NACK indicates to the RLC protocol layer that the previously transmitted status report was not successfully delivered to the peer RLC layer at the transmitting terminal. Therefore, in response to the local NACK from the MAC protocol layer, the RLC protocol layer may send an updated RLC status PDU.

More generally, the present invention provides a mechanism for retransmission of a status report for a retransmission protocol. A status report is generated and sent to a remote terminal according to the higher layer protocol. The status report is transmitted in one or more PDUs of a lower layer protocol. If the transmission of one of the lower layer PDUs fails, the lower layer protocol provides a failure indication to the higher layer protocol. In response to the failure indication, the higher layer protocol generates and sends an updated status report. In one exemplary embodiment, the higher layer protocol comprises a radio link control protocol and the lower layer protocol comprises a medium access control protocol.

DETAILED DESCRIPTION

Figure 1:
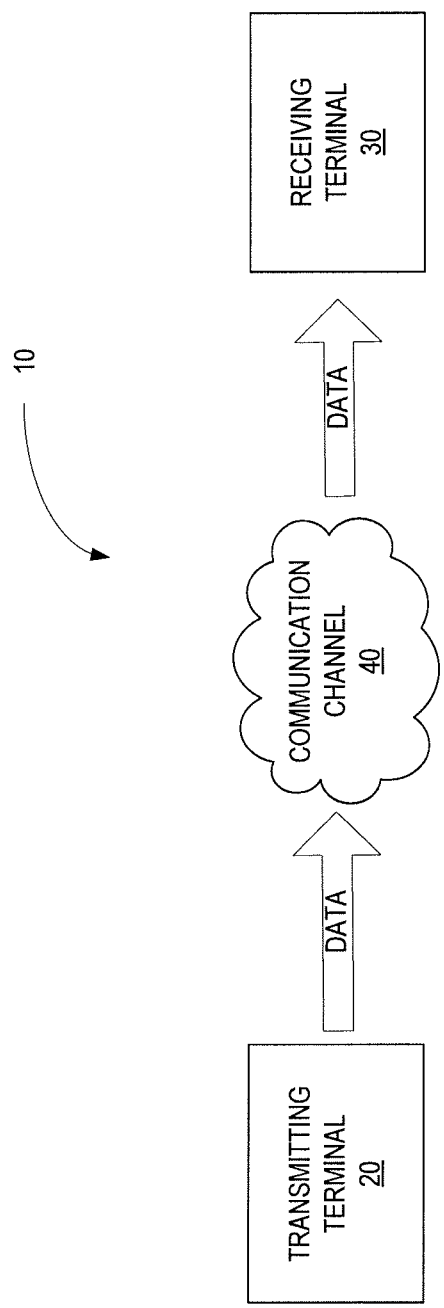
FIG. 1 illustrates a simplified communication system including a transmitting terminal and a receiving terminal.

Referring now to the drawings, the present invention will be described in the context of an exemplary mobile communication system 10 based on the Long Term Evolution (LTE) standards being developed by the Third Generation Partnership Project (3GPP). Those skilled in the art will appreciate, however, that the present invention may also be used in mobile communication systems 10 based on other standards now known or later developed. Thus, the following description should be viewed as illustrative, and not limiting.

The communication system 10, shown in FIG. 1, comprises a transmitting terminal 20 and a receiving terminal 30. The transmitting terminal 20 transmits data over a communication channel 40 to the receiving terminal 30. The transmitting terminal 20 may comprise a base station in an LTE network, sometimes referred to as an Evolved Node B (eNodeB), and the receiving terminal 30 may comprises a user terminal (e.g., cellular telephone, PDA, laptop computer, etc.). Alternatively, the transmitting terminal 20 may comprise a user terminal and the receiving terminal 30 may comprise a base station. It will also be appreciated that the transmitting terminal 20 and receiving terminal 30 may each comprise a communication terminal 100 (FIG. 4) with a transceiver for two-way communications. The terms "transmitting" and "receiving" are thus used herein to indicate the direction of communication between two communication terminals.

Figure 2:
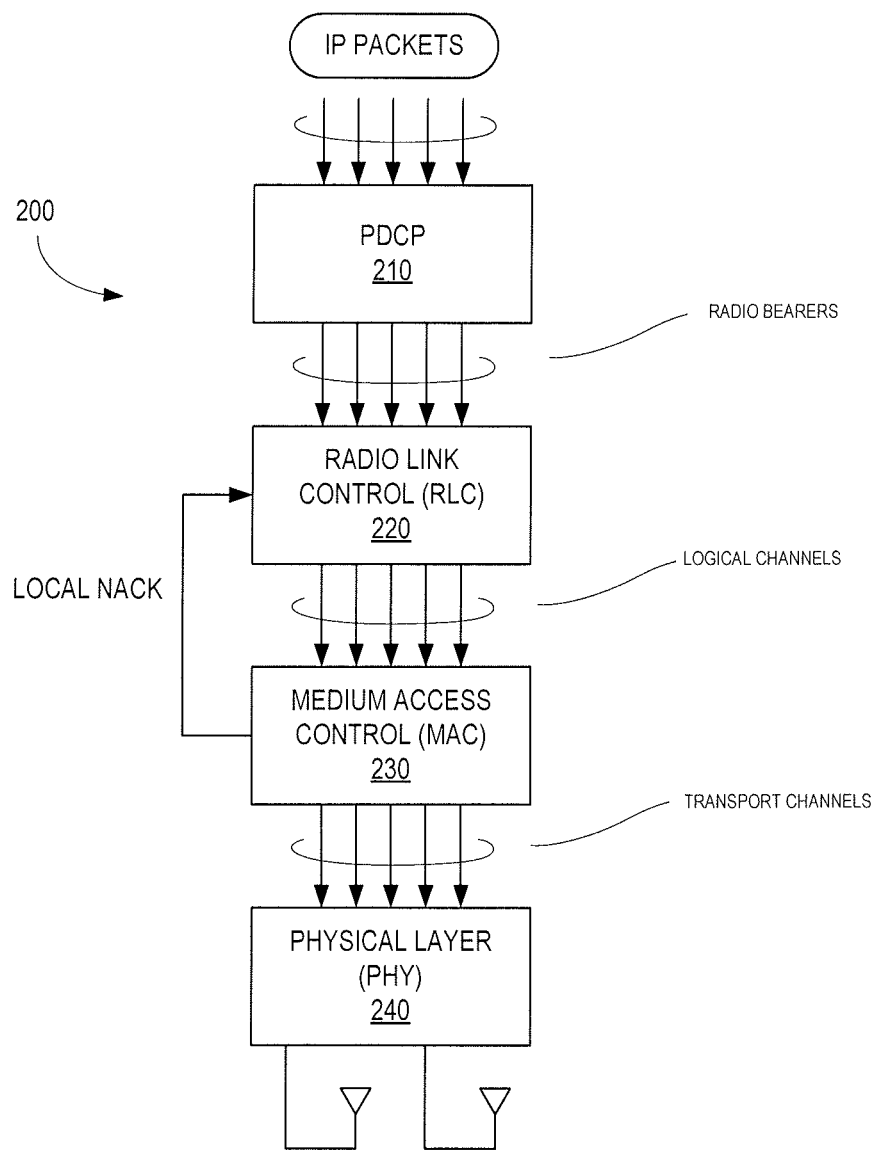
FIG. 2 illustrates an exemplary protocol stack for communications between a transmitting terminal and a receiving terminal.

FIG. 2 provides a general overview of the LTE protocol architecture 200, for communications between a transmitting terminal 20 and a receiving terminal 30 in LTE systems. The LTE protocol stack 200 is a layered protocol stack. Each layer of the protocol stack 200 represents a set of protocols or functions needed to communicate over the communication channel 40. The protocol stack 200 in LTE includes a physical (PHY) layer 240, the medium access control (MAC) layer 230, the radio link control (RLC) layer 220, and the packet data convergence protocol (PDCP) layer 210. The protocol stack 200 is typically implemented by a specially programmed processor.

User plane data in the form of IP packets to be transmitted enters the PDCP layer 210 where the IP headers may be compressed to reduce the number of bits transmitted over the air interface. PDCP layer 210 also performs ciphering and deciphering of the IP packets for security. RLC layer 220 ensures almost error free, in-sequence delivery of compressed IP packets to the PDCP layer 210 at the receiving terminal 30, which is needed for certain types of communication. At the transmitting terminal 20, the RLC layer 220 segments and/or concatenates compressed IP packets received over radio bearers from the PDCP layer 210 to create RLC protocol data units (PDUs). At the receiving terminal 30, the received RLC PDUs are reassembled into compressed IP packets and delivered to the PDCP layer 210. RLC layer 220 implements a retransmission protocol described in more detail below to handle retransmission of missing or erroneously received RLC PDUs. MAC layer 230 offers services to the RLC layer 220 in the form of logical channels. The MAC layer 230 maps RLC PDUs received from the RLC layer 220 on various logical channels to corresponding transport channels. The MAC layer 230 is also responsible for uplink and downlink scheduling. MAC PDUs are fed by the MAC layer 230 to the PHY layer 240. The PHY layer 240 handles coding/decoding, modulation/demodulation, interleaving, and spreading prior to transmission of one or more PHY layer PDUs.

In communication systems 10 implementing the LTE standards, a retransmission protocol is implemented at both the MAC layer 230 and the RLC layer 220. A Hybrid ARQ (HARQ) protocol is implemented in the MAC layer 230 to reduce the error rate to approximately 1%. A second retransmission protocol is implemented at the RLC layer 220 to correct residual errors and further reduce the error rate to the order of approximately $10^{-6}$. Conventionally, the HARQ protocol implemented in the MAC layer 230 and the retransmission protocol implemented at the RLC layer 220 are independent.

In LTE, the RLC retransmission protocol is implemented for RLC data PDUs transmitted in an acknowledged mode (AM). Each RLC data PDU includes a sequence number field that contains the sequence number of the data PDU. The sequence numbers are used by the RLC layer 220 at the receiving terminal 30 to detect missing PDUs and to reorder the data PDUs before they are delivered to the PDCP layer 210. When a gap in the sequence number of received RLC data PDUs is detected at the receiving terminal 30, the RLC layer 220 at the receiving terminal 30 generates and sends a status report to the transmitting terminal 20. Typically, the status report is contained in an RLC status PDU.

The RLC status PDU includes an Acknowledgement Sequence Number (ACK_SN) field indicating the lowest sequence among the RLC data PDUs that have been neither received nor detected as lost by the receiving terminal 30. The RLC status PDU also includes one or more Negative Acknowledgement Sequence Number (NACK_SN) fields that identify RLC data PDUs detected as lost by the receiving terminal 30. Thus, when a transmitting terminal 20 receives an RLC status PDU, it determines that all RLC data PDUs up to, but not including, the PDU corresponding to ACK_SN have been received, except for those RLC data PDUs identified by the one or more NACK SN fields.

An RLC status PDU may also be sent responsive to a polling request. In LTE, the RLC layer 220 at a transmitting terminal 20 may request an RLC status PDU from the receiving terminal 30 by inserting a polling request into a data PDU. An RLC data PDU may include a polling field that contains a single bit polling indicator. Typically, the polling indicator is set to a value of "1" to request a status report from the receiving terminal 30. In response to an RLC data PDU in which the polling bit P is set to "1", the RLC layer 220 at the receiving terminal 30 may generate an RLC status PDU.

Conventionally, an RLC status PDU is sent in an unacknowledged mode. Therefore, the receiving terminal 30 has no way of determining whether the RLC status PDU was successfully received at the transmitting terminal 20. Thus, there is no mechanism in the RLC retransmission protocol for the retransmission of an RLC status PDU. If the RLC status PDU is lost, then transmission of the missing RLC data PDUs from the transmitting terminal 20 to the receiving terminal 30 will be delayed until a new RLC status PDU is transmitted by the receiving terminal 30.

According to exemplary embodiments of the present invention, HARQ failure indications generated by the MAC layer 230 may be used to trigger transmission of an updated RLC status PDU by the RLC layer 220. The MAC layer 230 will generate the HARQ failure indication regardless of the payload carried by the corresponding RLC PDU. These failure indications may be used to generate a local NACK indication that is provided to the RLC layer 220 (FIG. 2). Thus, when the RLC layer 220 at the receiving terminal 30 receives a local NACK from the MAC layer 230 after sending the RLC status PDU, the RLC layer 220 may generate and transmit a new RLC status PDU. The old RLC status PDU may be discarded because the status information may have changed since the transmission of the original RLC status PDU. For example, new PDUs may have been received since the time that the original RLC status PDU was sent.

Figure 3:
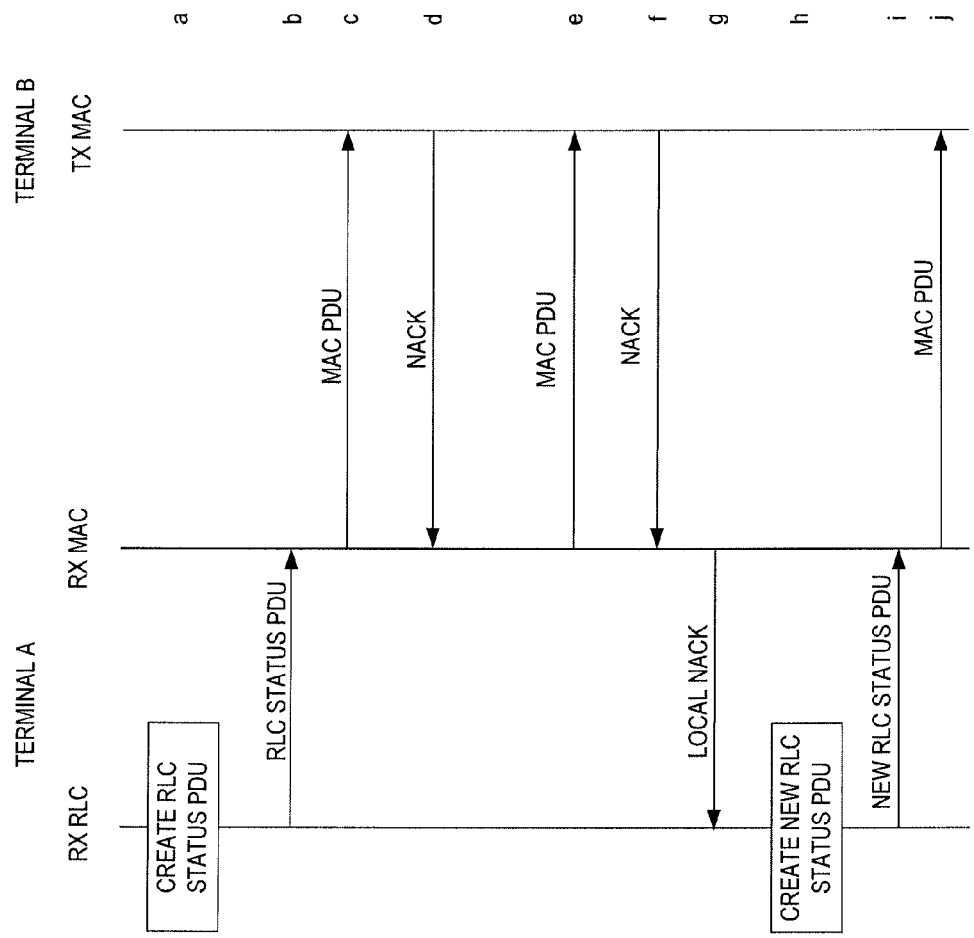
FIG. 3 illustrates an exemplary status reporting method for a radio link protocol implemented by a communication terminal.

FIG. 3 illustrates an exemplary status reporting method for an RLC retransmission protocol according to one exemplary embodiment. In FIG. 3, it is assumed that Terminal A (the receiving terminal 30) is receiving RLC data PDUs from Terminal B (the transmitting terminal 20). In FIG. 3, Terminal A detects a missing RLC data PDU based on the sequence numbers of the received RLC data PDUs and generates an RLC status PDU (step a) when a missing data PDU is detected. Both the RLC and MAC layers 220, 230 are shown for Terminal A, but only the MAC layer 230 is illustrated for Terminal B. The RLC status PDU is passed from the RLC layer 220 to the MAC layer 230 at Terminal A (step b). The MAC layer 230 at Terminal A creates one or more MAC PDUs from the RLC status PDU and transmits the MAC PDUs containing the RLC status PDU to Terminal B (step c). Those skilled in the art will appreciate that each MAC PDU may carry one RLC status PDU. Alternatively, the MAC layer 230 may segment the RLC status PDU, or concatenate multiple RLC status PDUs, to create the MAC PDUs.

In the illustrated example, it is assumed that the MAC layer 230 at Terminal B does not receive a MAC PDU carrying all or part of the RLC status PDU and sends a NACK to the MAC layer 230 at Terminal A to request retransmission of the MAC PDU (step d). The MAC layer 230 at Terminal A will retransmit the missing MAC PDU a predetermined number of times (step e). The NACK of the final retransmission of the MAC PDU denotes an HARQ failure (step f). In response to the HARQ failure, the MAC layer 230 at Terminal A generates and sends a local NACK to the RLC layer 220 at Terminal A (step g). The RLC layer 220 interprets this local NACK as an indication that the transmission of a STATUS PDU to Terminal B was unsuccessful.

In response to the local NACK, the RLC layer 220 at Terminal A discards the old RLC status report and creates a new RLC status report with the latest information (step h). This new RLC status report is then transmitted instead of retransmitting the old RLC status report, which may contain inaccurate information. The new RLC status report contained in one or more status PDUs is passed from the RLC layer 220 to the MAC layer 230 at Terminal A (step i). The MAC layer 230 at Terminal A creates one or more MAC PDUs from the RLC status PDUs and transmits the MAC PDUs to Terminal B (step j).

In LTE, a transmitting terminal 20 may poll the receiving terminal 30 for RLC status information. For example, a poll is typically sent by the transmitting terminal 20 to the receiving terminal 30 after transmitting the last RLC data PDU in a transmit buffer. The transmitting terminal 20 starts a poll timer when the poll request is sent. When the receiving terminal 30 receives a poll request, it immediately sends an RLC status PDU to the transmitting terminal 20 indicating the RLC status and starts a status prohibit timer to prohibit transmission of a second status report until the status prohibit timer expires. Thus, a RLC status PDU responsive to the detection of a missing RLC data PDU may be prohibited by the status prohibit timer in some circumstances.

In one exemplary embodiment, the RLC layer 220 at Terminal A may distinguish the events that triggered the original RLC status PDU. In the situation where the original RLC status PDU was triggered by a poll request, the poll timer at Terminal B will time out to trigger a new poll request. In this case no new status report needs to be sent based on the local NACK because a new poll request will be triggered by the poll timer. When a missing RLC data PDU triggers the original RLC status PDU, a new RLC status PDU should be generated and sent responsive to the local NACK because the other terminal is unaware of the RLC status PDU and no poll timer is running. In situations where the original RLC status PDU is triggered by a poll request, the status prohibit timer may be stopped when the local NACK is received. Stopping the status prohibit timer allows a subsequent RLC status PDU to be sent immediately upon the detection of a missing RLC data PDU without having too wait for the expiration of the status prohibit timer.

Figure 5:
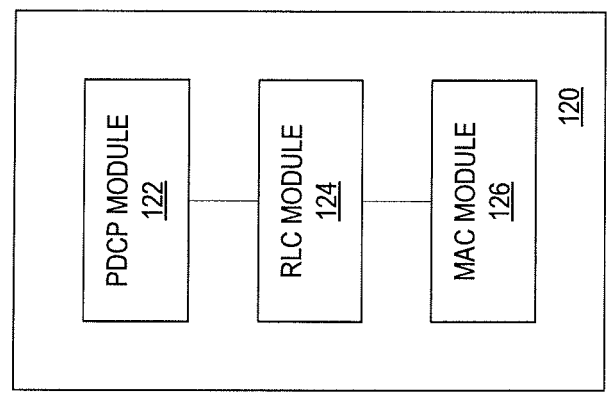
FIG. 5 illustrates an exemplary processor for a communication terminal for implementing the status reporting method shown in FIG. 3.
Figure 4:
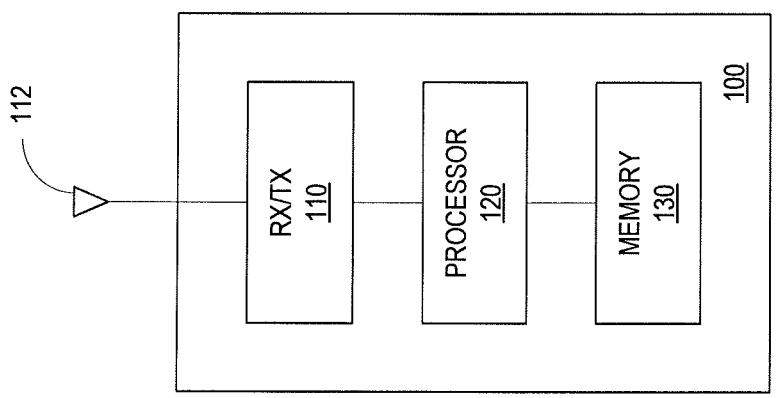
FIG. 4 illustrates an exemplary communication terminal.

FIG. 4 illustrates an exemplary communication terminal 100 that implements the retransmission protocol and status reporting method as previously described. The communication terminal 100 may function as a transmitting terminal 20, a receiving terminal 30, or both. The communication terminal 100 comprises a transceiver 110 connected to an antenna 112, a processor 120, and memory 130. The transceiver 110 enables the communication terminal 100 to transmit signals to and receive signals from a remote terminal. The communication terminal 100 may comprise, for example, a conventional cellular transceiver operating according to the LTE standard, WCDMA standard, or other communication standard now known or later developed. The processor 120 processes the signals transmitted and received by the transceiver 110 and controls operation of the communication terminal 100. Processor 120, shown in FIG. 5, includes a PDCP module 122, an RLC module 124, and a MAC module 126 for implementing the PDCP, RLC, and MAC protocols, respectively. Memory 130 stores programs and data needed for operation.

What is claimed is:

1. A method of transmitting a status report from a receiving terminal to a transmitting terminal, the method comprising:
   generating, by said receiving terminal, a status report according to a higher layer protocol;
   sending the status report from said receiving terminal to said transmitting terminal, the status report sent via one or more data units of a lower layer protocol;
   receiving, from the transmitting entity, a lower layer negative acknowledgement (NACK) for at least one of the one or more data units of the lower layer protocol that comprise the status report, the lower layer NACK indicating that the at least one of the one or more data units of the lower layer protocol that comprise the status report was not successfully received at the transmitting entity;
   providing a failure indication from the lower layer protocol to said higher layer protocol based on at least receiving the lower layer NACK from the transmitting entity, the failure indication indicating that transmission of at least one of the one or more data units of the lower layer protocol comprising the status report was unsuccessful; and
   in response to said failure indication, generating an updated status report at said receiving terminal and sending said updated status report from said receiving terminal to said transmitting terminal.

2. The method of claim 1, wherein said updated status report is not generated or sent if said original status report was sent responsive to a poll request.

3. The method of claim 1, further comprising stopping a status prohibit timer in response to said failure indication.

4. The method of claim 1, wherein said higher layer protocol comprises a radio link control protocol, and wherein said lower layer protocol comprises a medium access control protocol.

5. The method of claim 1, wherein the receiving terminal is a user terminal in communication with a base station acting as said transmitting terminal.

6. The method of claim 1, wherein the receiving terminal is a base station in communication with a user terminal acting as said transmitting terminal.

7. A communication terminal comprising:
   a transceiver; and
   a processor operatively associated with the transmitter and configured to:
      generate a status report according to a higher layer protocol;
      send the status report from the communication terminal to a transmitting terminal, the status report sent via one or data units formatted according to a lower layer protocol;
      receive, from the transmitting terminal, a lower layer negative acknowledgement (NACK) for at least one of the one or more data units of the lower layer protocol that comprise the status report, the lower layer NACK indicating that the at least one of the one or more data units of the lower layer protocol that comprise the status report was not successfully received at the transmitting entity;
      provide a failure indication from the lower layer protocol to said higher layer protocol based on at least receiving the lower layer NACK from the transmitting entity, the failure indication indicating that transmission of the one or more data units of the lower layer protocol comprising the status report was unsuccessful; and
      in response to said failure indication, generate an updated status report and send said updated status report from said transmitting terminal to said transmitting terminal.

8. The communication terminal of claim 7, wherein the processor is configured not to generate or send said updated status report if said original status report was sent responsive to a poll request.

9. The communication terminal of claim 7, wherein the processor is configured to stop a prohibit status timer in response to said indication.

10. The communication terminal of claim 7, wherein said higher layer protocol comprises a radio link control protocol, and wherein said lower layer protocol comprises medium access control protocol.

11. The communication terminal of claim 7, wherein the communication terminal comprises a user terminal.

12. The communication terminal of claim 7, wherein the communication terminal comprises a base station.

13. A method of transmitting a status report from a receiving terminal to a transmitting terminal, the method comprising:
- generating, by said receiving terminal, a status report according to a higher layer protocol;
- sending the status report from said receiving terminal to said transmitting terminal, the status report sent via one or more data units of a lower layer protocol;
- receiving, from the transmitting terminal, a lower layer negative acknowledgement (NACK) for at least one of the one or more data units of the lower layer protocol that comprise the status report, the lower layer NACK indicating that the at least one of the one or more data units of the lower layer protocol that comprise the status report was not successfully received at the transmitting entity;
- providing a failure indication from the lower layer protocol to said higher layer protocol based on at least receiving the lower layer NACK from the transmitting entity, the failure indication indicating that transmission of the status report was unsuccessful; and
- in response to said failure indication, generating an updated status report at said receiving terminal and sending said updated status report from said receiving terminal to said transmitting terminal.

14. The method of claim 13, wherein said updated status report is not generated or sent if said original status report was sent responsive to a poll request.

15. The method of claim 13, further comprising stopping a status prohibit timer in response to said failure indication.

16. The method of claim 13, wherein said higher layer protocol comprises a radio link control protocol, and wherein said lower layer protocol comprises a medium access control protocol.

17. A communication terminal comprising:
- a transceiver; and
- a processor operatively associated with the transmitter and configured to:
  - generate a status report according to a higher layer protocol;
  - send the status report from the communication terminal to a transmitting terminal, the status report sent via one or data units formatted according to a lower layer protocol;
  - receive, from the transmitting terminal, a lower layer negative acknowledgement (NACK) for at least one of the one or more data units of the lower layer protocol that comprise the status report, the lower layer NACK indicating that the at least one of the one or more data units of the lower layer protocol that comprise the status report was not successfully received at the transmitting entity;
  - provide a failure indication from the lower layer protocol to said higher layer protocol based on at least receiving the lower layer NACK from the transmitting entity, the failure indication indicating that transmission of the status report was unsuccessful; and
  - in response to said failure indication, generate an updated status report and send said updated status report from said transmitting terminal to said transmitting terminal.

18. The communication terminal of claim 17, wherein the processor is configured not to generate or send said updated status report if said original status report was sent responsive to a poll request.

19. The communication terminal of claim 17, wherein the processor is configured to stop a prohibit status timer in response to said indication.

20. The communication terminal of claim 17, wherein said higher layer protocol comprises a radio link control protocol, and wherein said lower layer protocol comprises medium access control protocol.

\* \* \* \* \*

UNITED STATES PATENT AND TRADEMARK OFFICE
CERTIFICATE OF CORRECTION

PATENT NO. : 9,871,625 B2  
APPLICATION NO. : 12/811732  
DATED : January 16, 2018  
INVENTOR(S) : Anna Larmo, Michael Meyer and Johan Torsner It is certified that error appears in the above-identified patent and that said Letters Patent is hereby corrected as shown below:

On the Title Page

Item (73): Replace "ID TP" with --IDTP--.

Signed and Sealed this  
Seventeenth Day of April, 2018

Andrei Iancu  
*Director of the United States Patent and Trademark Office*